June 14, 1949. H. N. HOFFMAN 2,473,250
DUAL RATIO GEARING
Filed Sept. 10, 1948
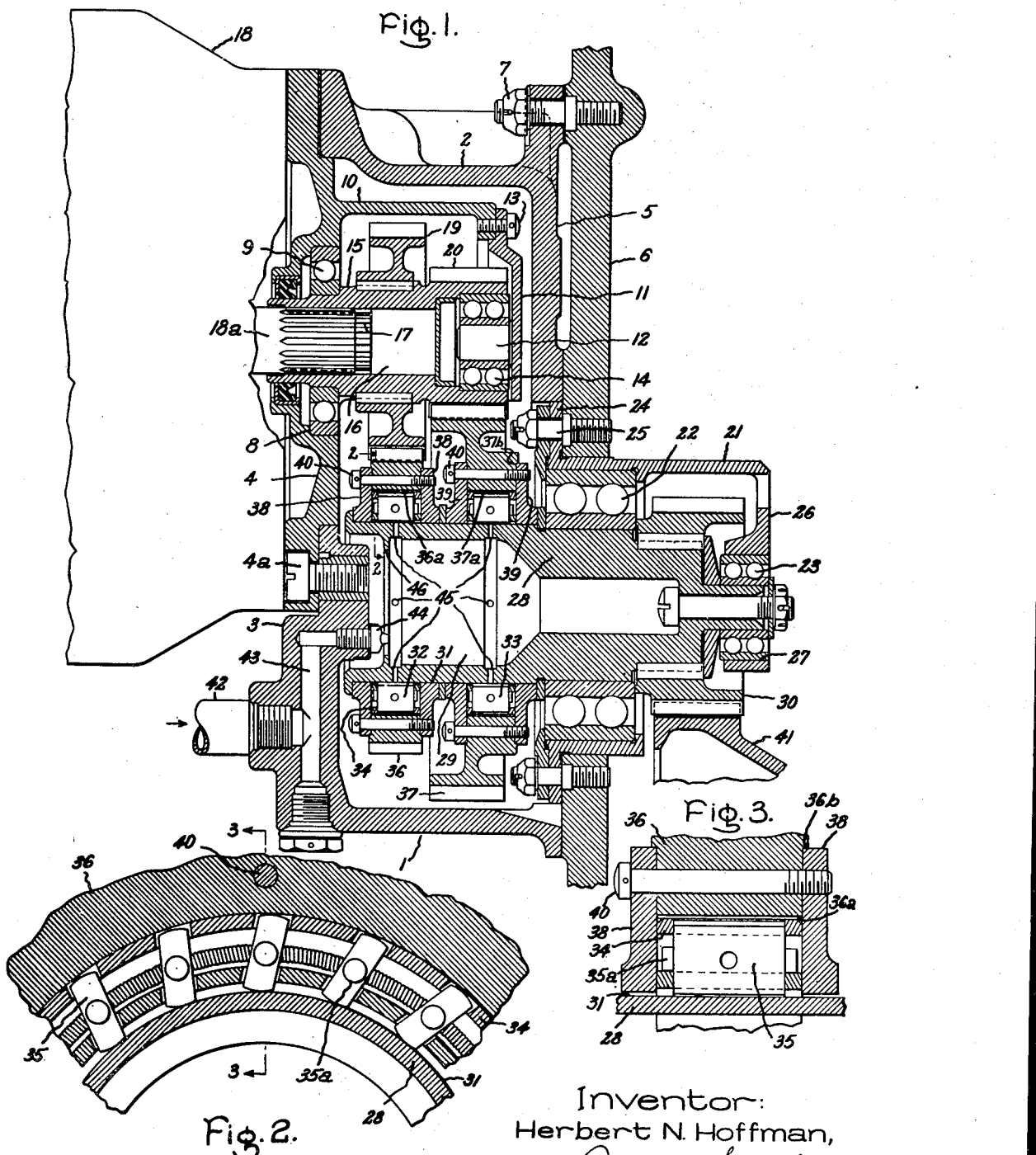
Inventor:
Herbert N. Hoffman,
by [signature]
His Attorney.

Patented June 14, 1949

2,473,250

UNITED STATES PATENT OFFICE 2,473,250

DUAL RATIO GEARING

Herbert N. Hoffman, Wakefield, Mass., assignor to General Electric Company, a corporation of New York Application September 10, 1948, Serial No. 48,648

1 Claim. (Cl. 74—6)

This invention relates to mechanical speed and power transmission gearing, more particularly to dual-speed-ratio gearing for driving an accessory of an internal combustion engine, which accessory may drive the engine or, alternatively, may be driven thereby.

In aircraft service it is common to drive an electrical generator by a mechanical power take-off from the engine. It is also common to provide a similar mechanical connection between the engine shaft and an electric starting motor through suitable gearing. Particularly in aircraft service, it is mandatory that weight and bulk be reduced to an absolute minimum. It is therefore desirable in such applications, to combine the functions of the starting motor and the generator into a single dual-purpose accessory unit. For reasons of efficiency, and because the normal operating speeds of the engine usually do not match the operating and the starting speeds of a dual-purpose accessory such as a combined starter-generator, it is desirable to provide two different speed ratios between the accessory shaft and the engine shaft; one ratio being effective during the starting operation when power is supplied from the accessory unit, acting as starter motor, to the engine, and another ratio for use when the accessory is being driven as a generator by the engine shaft.

It is an object of this invention to provide a novel gearing arrangement in which a dual-speed ratio is provided between power transmission shafts and, in which one or another speed ratio is automatically obtained depending upon whether or not a given shaft is driving or being driven.

Other objects and advantages will be apparent from the following description taken in connection with the accompanying drawings, in which Figure 1 is a sectional view of a mechanical power take-off for an aircraft engine with gearing in accordance with the invention; Figure 2 is a view, partly in section, of one type of clutch which may be employed, taken on the plane 2—2 in Figure 1; and Figure 3 is a section taken on the plane 3—3 in Figure 2.

Referring now to Figure 1, a gear casing is indicated generally at 1. The casing comprises an irregular continuous wall surface 2, which completely encloses the gearing. The enclosing wall surface 2 may be closed at one end by an end wall 3, which may be cast integrally with the enclosing wall. As illustrated, wall 3 is provided with an opening therein to permit access to and/or to permit removal of a portion of the gear train. A removable portion of wall 3 forms a bearing support housing 4, and is arranged to be secured to wall 3 by any suitable means, as for example by threaded fastenings 4a. Bearing housing 4 is also arranged to serve as a "mounting pad" for a dual-purpose accessory unit 18, for example a starter-generator. Means for securing the accessory unit to bearing housing 4 are provided, but are not material to an understanding of the present invention and, therefore, are not shown.

The opposite end of enclosing wall 2 is closed by an end wall 5, which also may be cast integral with the enclosing wall 2. The entire casing 1, is adapted to be supported by and secured to an end wall 6 which forms a portion of the power plant casing. The gear casing may be secured to wall 6 by means of threaded fastenings 7.

A recessed portion 8 is provided in cover plate 4 to receive a bearing 9. For the purpose of supporting additional bearing means, a support 10 which extends axially into the gear casing may be cast integral with cover plate 4. A radially projecting support member 11 having an axially extending shaft section 12 secured thereto may be attached to support member 10 by means of threaded fastenings 13. Shaft section 12 serves to support a second bearing 14.

A shaft 15 is rotatably supported in bearings 9, 14. As illustrated, shaft 15 is provided with a central bore 16 and an integral spline 17. Shaft 15 is connected to a combined source and consumer of power represented by the starter-generator 18 which may be provided with a shaft 18a having an external splined portion for drivingly engaging the internal spline 17 of shaft 15.

Gears 19, 20 having substantially different pitch diameters are carried by shaft 15 and may be secured thereto by suitable key means or their equivalent. As illustrated, gear 19 is keyed to shaft 15 and gear 20 is formed integral with the shaft.

The power plant casing wall 6 previously referred to, has an opening therein for receiving a "cartridge" 21 which forms a bearing housing and support for spaced bearings 22, 23. A flanged portion 24 is provided at one end of bearing housing 21 to permit securing the bearing housing to the power plant casing wall 6 by means of threaded fastenings 25. At the opposite end of cartridge 21 and integral therewith is an overhanging portion 26. The overhanging portion 26 is provided with a central bore 27 to receive and support bearing 23.

Bearings 22, 23 rotatably support a second shaft 28 which is provided with a central bore 29.

As indicated in Figure 1, a portion of shaft 28 projects to the right in the drawing through the power plant casing wall 6, and the remaining portion projects into the gear casing 1. For reasons which will become apparent later, a gear 30 may be carried at the right-hand end of shaft 28 and may be secured thereto by key or spline means. At the opposed end of shaft 28 there is provided a cylindrical portion 31 which serves as the inner race of "free-wheeling" or "overrunning" clutches 32, 33. These clutches may comprise an annular member 34, Figs. 2 and 3, having radially extending end portions which support a plurality of shaft-engaging "sprags" 35. Gears 36, 37 are each provided with a central bore, 36a, 37a, which serves as the outer race of the clutches. These gears have different pitch diameters and engage gears 19 and 20, as will be apparent from the drawing. Gears 36, 37 are secured concentrically with respect to shaft section 31 and clutches 32, 33 by collars 38 and 39, which fit into rabbets 36b, 37b in the gears, and are secured to the gears by suitable threaded fastenings 40. Collars 38, 39 also serve to maintain the proper axial spacing of gears 36, 37 along shaft 31 and in addition, serve as bearings with shaft section 31 acting as a journal when the clutches are overrunning. The internal diameters of the collars are so proportioned as to provide normal bearing clearance between them and the shaft section 31. However, the clearance between the collars and the shaft section 31 must be made sufficiently small to prevent slipping of the "sprags" 35 when the load is applied. Furthermore, the various clutch members or "sprags" 35 are so proportioned with respect to shaft portion 31 and the bores 36a, 37a that there is at least one drivingly-engaged position of the gear, clutch and shaft, and relative movement of the gear and the shaft is permitted in other positions of clutch members 35. For the purpose of providing coupling means to connect the gearing with the engine, gear 30 may engage a gear 41 which is connected to the engine shaft (not shown).

Referring now to Figures 2 and 3, the shaft engaging members or "sprags" 35 are supported by annular member 34 which also serves to maintain equal circumferential spacing of the "sprags" when the clutch is transmitting torque. Member 34 does not transmit any torque itself. The clutch members or "sprags" 35 are provided with axially extending end portions forming pins 35a, which loosely engage the radially extending portions of annular member 34 in such a manner as to permit rotation of "sprags" 35 with respect to the annular member. The length of members 35 is such that rotation of the shaft in one direction causes the "sprags" 35 to be forced against the surface 31 of shaft 28 and the bore of gear 36 or 37. Thus it will be apparent that at some relative position of rotation of the shaft with respect to its associated gear, either 36 or 37, the shaft, gear and clutch will be locked in a drivingly engaged position.

Assume now for the purpose of illustration, that the shaft 28 is rotated slightly in a clockwise direction relative to gear 36 when shaft 28 is viewed in a direction from left to right in the drawing. "Sprags" 35 of clutch 32 will be forced against shaft section 31 and the bore 36a in the manner already described until shaft 28, clutch 32 and gear 36 are locked in a drivingly engaged position thus being capable of torque transmission in a clockwise direction. It will be obvious to those skilled in the art that relative rotation of the shaft in a direction counterclockwise with respect to gear 36 frees the gear from the shaft. As illustrated in Fig. 1, clutch 32 is arranged as described above, and clutch 33 and gear 37 are arranged in a similar manner but are adapted to transmit torque in the opposite direction.

Referring again to casing 1, an opening is provided in end wall 5, which opening is of greater diameter than the larger of gears 36, 37. As previously indicated, shaft 28 is rotatably supported by bearing means in bearing housing 21, which is in turn supported by wall 6. The use of this arrangement permits the casing to be removed axially from wall 6 without disturbing shaft 28 and gears 36, 37 carried thereon.

Lubrication may be provided for the clutch means 32, 33 as follows. A lubricant, for example oil, is conveyed from a suitable source (not shown) by means of a conduit 42 which communicates with a lubricant supply passage 43 provided in wall 3 of the casing. Also communicating with passage 43 is a nozzle 44 secured to the end wall 3 of the casing and arranged in cooperative relation with the central bore 29 to direct the lubricant therein. A plurality of openings 45 are provided in shaft 28 which communicate between the central bore 29 and each of the clutch means 32, 33. To insure that a portion of the oil which is directed to the interior of the central bore 29 is retained therein, a shoulder portion 46 is provided in shaft 28 in cooperative relation with the bore 29. The lubricant which is trapped in the bore 29 by shoulder 46 in rotating shaft 28, is pumped through openings 45 by centrifugal force to provide lubrication for the clutch means 32, 33.

During the starting period, the operation of the apparatus is as follows. The starter-generator, functioning as a starting motor, supplies torque to shaft 15. For the purpose of illustration, it may be assumed that the torque is applied in a counterclockwise direction when shaft 15 is viewed in the direction from left to right in the drawing. Due to the inertia of the engine parts, the engine shaft and gear 41 tend to remain stationary, and thus shaft 28 likewise tends to remain stationary. Therefore, clutch 33, for example, will assume its engaging position as previously described, and shaft 28 is therefore driven in a clockwise direction of rotation by shaft 15 at a speed ratio which is dependent upon the pitch-diameter ratio of gears 20 and 37. As illustrated in the drawing, gear 20 is of smaller pitch diameter than gear 37. Therefore, shaft 28 will rotate at a speed slower than that of shaft 15. As previously indicated, the speed ratio of gears 19 and 36 is different from that of gears 20 and 37, and since, as illustrated, gears 19 and 36 are of more nearly equal pitch diameter, gear 36 will tend to rotate in the same direction as shaft 28 but at a higher rotational speed. This is permitted by the previously described action of the clutch means, in this case clutch 32, which is adapted to transmit torque only in a counterclockwise direction when torque is supplied by shaft 15 and which, under the above-mentioned conditions, merely slips on shaft 28.

After the engine has been started, it accelerates under its own power and ultimately tends to transfer torque from the engine shaft to gear 41, thus furnishing clockwise torque to shaft 28 which in turn tends to drive shaft 15. When such action takes place, shaft 15 tends to lag behind shaft 28, or in other words, shaft 28 tends to run ahead of shaft 15. In accordance with the clutch action previously described, clutch 32 now drivingly engages shaft 28 to form the driving connection between shaft 28 and shaft 15 through gears 36 and 19. Due to the fact that gear 20 rotates at the same rotational speed and in the same direction as gear 19, gear 37 will be driven in the same direction as shaft 28 but at a lower rotational speed than that of shaft 28, with clutch 33 slipping relative to shaft 28 in accordance with the action previously described.

Thus it will be seen that the invention furnishes a novel gearing arrangement which is capable of providing a dual-speed ratio between its input and output shafts, in which either of two pre-selected speed ratios are automatically obtained without the necessity for gear shifting equipment or other mechanical complexity, and is light in weight so as to be peculiarly suitable for aircraft service.

While a particular embodiment of the invention has been illustrated and described, it will be apparent to those familiar with the art that various changes and modifications may be made without departing from the invention, and it is intended to cover in the appended claim all such changes and modifications as come within the true spirit and scope of the invention.

What I claim as new and desire to secure by Letters Patent of the United States is:

An automatic dual-ratio gearing comprising a first supporting wall having an opening therein, a gear casing having first and second end walls, said first end wall having an opening adapted to receive a first bearing housing, means securing the bearing housing to the casing, bearing means in the bearing housing, a shaft rotatably supported by the bearing means, first and second axially spaced gears having different pitch diameters secured to the shaft, walls defining a second bearing support housing disposed through the opening in the supporting wall and having a flanged portion secured to the wall, second bearing means in said housing, a second shaft rotatably supported by the second bearing means, third and fourth axially spaced gears having different pitch diameters concentric with said second shaft and in mesh with the first and second gears respectively, said second end wall having an opening therein of greater diameter than the larger of said third and fourth gears and concentric with the second shaft whereby the casing may be removed axially, first uni-directional clutch means arranged in cooperative relation between the third gear and the second shaft, second uni-directional clutch means arranged in cooperative relation between the fourth gear and the second shaft and adapted to transmit torque in a direction opposed to the direction of torque transmission of the first clutch means, each of said clutch means being adapted to permit free relative rotation of said shaft and the associated gear in the direction of rotation opposed to the direction of torque transmission of the clutch means, and means for supplying torque to either of said shafts, whereby upon application of torque in a given direction to the first shaft one of the clutch means transmits torque from its associated gear to the second shaft for the transmission of power at a certain speed ratio, whereas upon application of torque to the second shaft the other clutch means transmits torque between its associated gear and the first shaft for the transmission of power at a different speed ratio.

HERBERT N. HOFFMAN.

REFERENCES CITED

The following references are of record in the file of this patent:

UNITED STATES PATENTS

| Number | Name | Date |
|---|---|---|
| 2,451,767 | Nardone | Oct. 19, 1948 |

FOREIGN PATENTS

| Number | Country | Date |
|---|---|---|
| 687,056 | France | Apr. 22, 1930 |